(12) United States Patent
Fortune

(10) Patent No.: US 6,704,776 B1
(45) Date of Patent: Mar. 9, 2004

(54) SELECTING ATTRIBUTE BASED CONTENT FOR SERVER APPLICATIONS

(75) Inventor: Erik Fortune, Los Altos, CA (US)

(73) Assignee: WebTV Networks, Inc., Mountain View, CA (US)

(*) Notice: Subject to any disclaimer, the term of this patent is extended or adjusted under 35 U.S.C. 154(b) by 434 days.

(21) Appl. No.: 09/607,444

(22) Filed: Jun. 30, 2000

(51) Int. Cl.$^7$ .............................................. G06F 15/16
(52) U.S. Cl. ...................... 709/219; 709/217; 709/246; 707/10; 707/513
(58) Field of Search .................................. 709/217, 218, 709/219, 201, 203, 246, 200, 202; 707/10, 513

(56) References Cited

U.S. PATENT DOCUMENTS

| | | | | |
|---|---|---|---|---|
| 5,761,662 A | * | 6/1998 | Dasan ........................ | 707/10 |
| 5,944,790 A | * | 8/1999 | Levy ......................... | 709/218 |
| 6,029,182 A | * | 2/2000 | Nehab et al. ............... | 715/523 |
| 6,055,542 A | * | 4/2000 | Nielsen et al. ............. | 707/104.1 |
| 6,119,078 A | * | 9/2000 | Kobayakawa et al. ......... | 704/3 |
| 6,300,947 B1 | * | 10/2001 | Kanevsky .................... | 345/866 |
| 6,345,292 B1 | * | 2/2002 | Daugherty et al. .......... | 709/214 |
| 6,347,316 B1 | * | 2/2002 | Redpath ...................... | 707/10 |
| 6,374,237 B1 | * | 4/2002 | Reese ............................ | 707/3 |
| 6,401,094 B1 | * | 6/2002 | Stemp et al. ................. | 707/10 |
| 6,460,036 B1 | * | 10/2002 | Herz ............................ | 707/10 |

* cited by examiner

Primary Examiner—Glenton B. Burgess
Assistant Examiner—Mareisha N. Winters
(74) Attorney, Agent, or Firm—Workman Nydegger

(57) ABSTRACT

The present invention provides a decision engine and a content directory for use in identifying an appropriate instance of data to be used by an application. This process of localizing data is related to the need of providing contextually appropriate data to an end user. The application presents a request for an instance of the data to the decision engine. The decision engine accesses the content directory to determine the rules and attributes that govern the decision made by the decision engine. Depending on the rules and the attributes, the decision engine may require the application to supply certain values that are indicated by the rules and attributes. Based on these values, the decision engine is able to identify the contextually appropriate instance of the data for the application. The application is responsible for accessing the identified instance.

19 Claims, 3 Drawing Sheets

SELECTING ATTRIBUTE BASED CONTENT FOR SERVER APPLICATIONS

BACKGROUND OF THE INVENTION

1. The Field of the Invention

The present invention relates to systems and methods for customizing data provided to users. More particularly, the present invention relates to systems and methods for providing a user with the contextually appropriate data requested by an application based on properties associated with the user, a user's computer, etc.

2. The Prior State of the Art

As access to the Internet through set top boxes and other systems becomes more prevalent, it is increasingly difficult to adapt or localize the images, text and other data provided to users in appropriate manners based on the language, country, and other attributes of the user. Ideally, all of these attributes are taken into account before the localized data is provided to the user. In reality, only one or two attributes are utilized in localizing data presented to an end user. Because the Internet has made data globally available, identifying contextually appropriate data is a pressing issue and there is a need for a decision process that is able to account for additional attributes such that data provided and presented to an end user is appropriately localized.

While the problem of localizing data or providing contextually appropriate data is usually related to user attributes or preferences, the set top boxes and other devices used to provide and display data to end users are made by multiple manufacturers and are available in a variety of configurations. Many set top boxes have a television tuner, while other set top boxes do not have a television tuner. Some set top boxes provide a relatively small display device, while other set top boxes have a relatively large display device. Thus, there are many factors in addition to user preferences that may potentially affect the version of data that is ultimately presented to an end user.

The localization of images and text to particular users has typically been based on a system or specific notion of locale. Current localization techniques typically specify a combination of both country and language such that the most appropriate cultural and linguistic behavior may be identified. This technique permits a single value or locale ID to identify most cultural and linguistic variants. For example, "fr-CA" specifies the French language in Canada while the value of "fr-FR" specifies the French language in France.

This approach is limited because relatively few cultural and linguistic combinations have been explicitly defined. Further, contextually identifying an appropriate linguistic source for user language preferences does not resolve other issues. For instance, if the language attribute of a particular user specifies only a single value, an appropriate fallback language cannot be selected if the primary language is not available.

The use of location or country introduces similar problems. For example, if a user is situated in a Canadian suburb of Detroit, the television, movie and restaurant listings provided to an end user should probably be those specific to Detroit, but the terms of service and other legal information are specific to Canada. Depending on the country attribute of the user, the data provided to the user may not be the most appropriate data. The combination of language and country is therefore not always satisfactory because the appropriate data localization is dependent on the application and on context. Thus, a country or location attribute does not always ensure a user of receiving contextually appropriate data.

Even though the notion of locale provided by using a combination of language and country in traditional systems is suitable for simple applications, it can become complex, redundant, and unmanageable when other factors are considered. For example, consider a web page where the text to be displayed is dependent on the size of the user's display device. A typical solution is to store the text for large displays in a "large.txt" file while the text for small displays is stored in a "small.txt" file. This solution, while seemingly simple, is rather complex because a "small.txt" file must be created for each separate language and country locale. In addition, if the "small.txt" and "large.txt" are included from other files, each point of inclusion in the text files must be appropriately modified. Alternatively, the application code can be altered to accommodate the potential possibilities that result from supporting two separate text files. Because the application code will most likely have to be altered in several locations, this alternative is complex, subject to having unintentional errors introduced into the code, and may ultimately provide inconsistent data to an end user.

At this stage, the complexity is still relatively manageable. Now, consider adding support for Japanese in the same example. Because of the difficulty of Kanji, Japanese children learn to read using phonetic scripts or Kanji annotated with the phonetic scripts. As a result of supporting Japanese in this example, there are four possibilities for each locale: adult, adult on a small screen, child, and child on a small screen. To accommodate each possibility, either four separate files must be created for each locale, or specialized and complicated code must be added to determine the appropriate version to be presented to a user. Creating four separate files quadruples the amount of text to be localized and increases the likelihood of inconsistent translation. Alteration of the code of the application must be made consistently throughout the application and it is more likely that different sections of the code will have inconsistent behavior as the code evolves over time.

The complexity of this problem increases exponentially as additional factors are taken into account. The complexity may be evident in the application's source code, where it is very difficult to accurately modify primarily because alterations to different sections of the source code of an application can occur separately and inconsistently. Because the appropriate localization of data is primarily dependent on context and application, which in turn are dependent on a number of specific factors, current localization systems cannot effectively account for all factors because of the complexity that is introduced.

SUMMARY OF THE INVENTION

The present invention provides systems and methods for selecting contextually appropriate data. The attribute based content provided by the present invention, in addition to being extensible and configurable, avoids the complexity of altering an application's source code by relieving the application from having to select an appropriate version or representation of data that is ultimately provided to an end user. By relieving applications of this responsibility, attribute based content ensures consistency across applications. Additionally, the appearance and behavior of particular applications can be customized without altering the application's source code. In essence, attribute based content can be implemented by an extensible, embedded, externally configurable decision engine that provides applications and content providers that ability to easily and consistently provide contextually appropriate versions of both applications and data.

The overall purpose of an attribute based content system is to execute decisions for an application. For instance, assuming that multiple versions of a particular file or target are available, an attribute based content system would identify the appropriate version or instance of the file to be used by an application. The essential components of an attribute based content system that allow a contextually appropriate resource to be identified are a content directory and a decision engine.

When an application invokes the decision engine, the decision engine examines the compiled content directory for the rules that relate to the decision being made for the application. As part of this process, the decision engine may query the application for information about the context in which the decision is to be made. This information is typically in the form of user preferences, attributes and the like. The attribute based content system then returns a value that results from evaluating the rules specified in the content directory against the context used to satisfy the application's request. The value returned by the decision engine is typically a string and the application is responsible for actually accessing the data or file referenced by the string returned by the decision engine if necessary.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
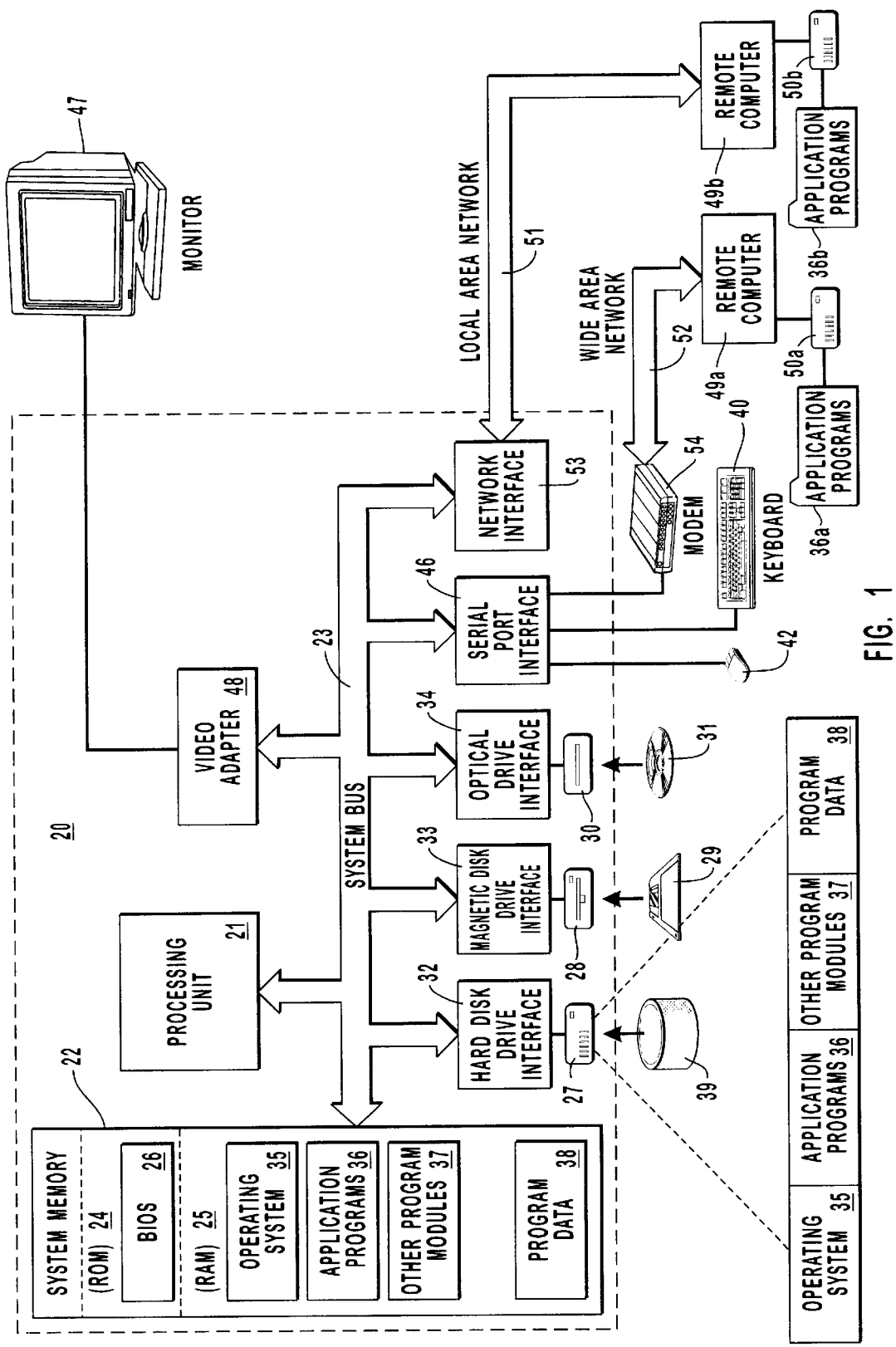
FIG. 1 illustrates an exemplary system that provides a suitable operating environment for the present invention.

The ability to localize data for a particular user has typically been dependent on evaluating the language and country of the user. While this ability permits common linguistic and cultural requirements to be identified, there are relatively few combinations that are explicitly defined. Introducing additional criteria or factors into the localization process has traditionally introduced excessive complexity into the code of the relevant applications and has resulted in the excessive duplication of the data or material being localized.

When an application must make a decision between various versions of data, the present invention provides the ability to resolve the decision according to the criteria and factors that are relevant to the context of the decision. An extensible decision engine, which uses rules that are external to the application, is provided that allows data to be effectively localized without having to alter the code of the applicable applications. Thus, complicated and unanticipated problems that may arise from attempting to maintain and repeatedly update the source code of an application are therefore effectively eliminated and inconsistencies are avoided.

In conjunction with the decision engine, a content directory is compiled that contains the attributes and rules that are necessary to make a contextually appropriate decision. The content directory also identifies the appropriate instances or versions of the data that is being localized for the application. Based on an evaluation of the attributes and rules, the decision engine is able to identify a contextually appropriate version of the data. After the decision is made by the decision engine, the value of the appropriate instance is returned to the application and the application is typically responsible for accessing the data represented by that value.

As used herein, a "target" refers to a particular group or set of data. A "target" also refers to a set of strings that may be used in response to a request. Often the group of data or set of strings are multiple representations of the same data and each separate representation of the data within the target data is referred to herein as an "instance." For example, consider an application that that provides text messages, which are a set of strings, in different languages. The target in this example would comprise the message strings collectively and each separate language would therefore be an instance of the messages target.

The present invention extends to both methods and systems for generating attribute based content. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
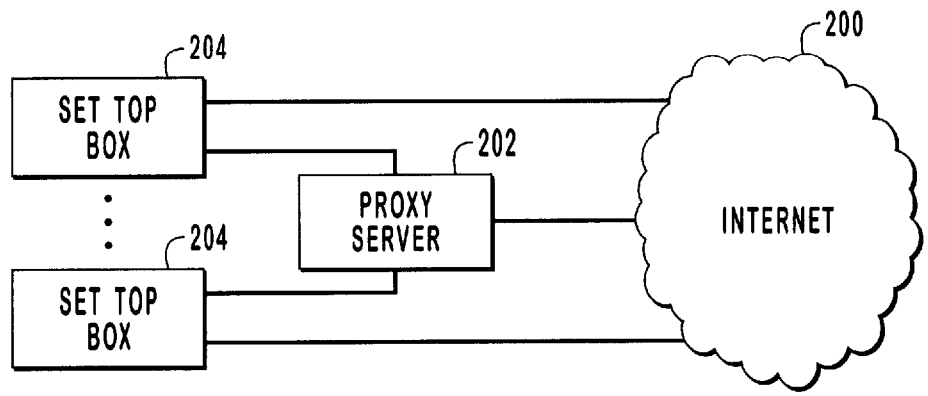
FIG. 2 is a block diagram of an exemplary system for implementing the present invention.

FIG. 2 illustrates an exemplary environment in which the systems and methods of the present invention may be practiced and implemented. Set top box 204 is representative of devices that are capable of receiving data from a network such as the Internet 200 including computers, internet terminals using a television set for a monitor, and the like. In some embodiments, set top box 204 is a client or a client computer and is capable of communicating with servers or server computers. Set top box 204 is also capable of displaying the data received from the Internet 200 on a display device such as a computer monitor or, as indicated above, a television set. Set top boxes 204 are available in a variety of configurations and as a result, some of set top boxes 204 may include tuners for tuning television signals, some of set top boxes 204 may be connected with relatively small display devices, and some of set top boxes 204 may be operating with different versions of a particular software or different levels of subscription services. As a result, the particular configuration of a particular set top box 204 may have an effect on the data that is localized for that set top box.

In many instances, set top box 204 accesses the Internet 200 through a proxy server 202. The proxy server 202 is capable of providing each of the set top boxes 204 with content that is specific and localized for each set top box 204. In context of the present invention, the localization of data provided to set top boxes 204 occurs at the proxy server 202 in some embodiments or at computers associated with specific Internet sites in other embodiments. However, the systems and methods of the present invention may be implemented at the set top box 204, at other servers, or embedded within applications operating at either the set top box 204, the proxy server 202, or other servers. Additionally, set top boxes 204 may be capable of accessing the Internet 200 without the use of the proxy server 202.

Figure 3:
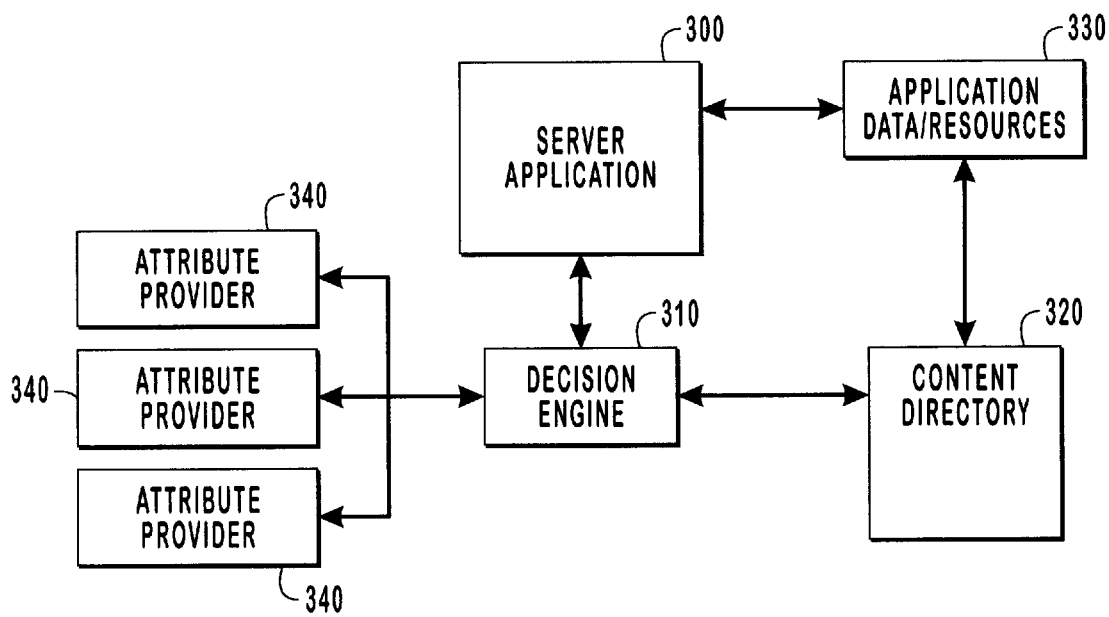
FIG. 3 is a block diagram illustrating an exemplary embodiment of the present invention.

FIG. 3 is a block diagram detailing the major components of exemplary systems and methods for localizing data. Generally, the present invention enables an application to provide an adaptable, customized user interface by effectively localizing for the application the data presented to a user via the user interface. This is primarily accomplished by having server application 300 ask the decision engine 310 to make a decision relating to the application data 330 to be localized and displayed. Application data 330 is representative of the data or resources that are presented to users. For instance, the application data 330 may comprise multiple versions of the text for a particular web page. Each version of text, however, is in a different language.

The server application 300 begins the process of localizing the web page by asking the decision engine 310 to determine which version of the web page is contextually appropriate for a particular user. Specific lines of the code of server application 300 may result in requesting decision engine 310 to make the decision. Alternatively, decisions can be requested from the decision engine 310 as the server application 300 executes a server-side script such as those disclosed in U.S. patent application Ser. No. 09/607,839, filed Jun. 30, 2000, entitled "Server-side Scripting that Enables Creation of Customized Documents for Clients," which is incorporated herein by reference.

The server application typically supplies a name of a target to the decision engine 310 and in this case, the target may represent a set of be a string files which may contain the text of the web page in the various appropriate languages. The decision made by the decision engine 310 is to select the appropriate language according to a context typically identified by the server application 300. More generally, the decision made by the decision engine 310 is to select the appropriate version of some file or object that has multiple representations.

The content directory 320 contains information about targets and their associated attributes. In one sense, the attributes are analogous to rules that govern the application and validity of a particular target instance. Continuing with the language example, the content directory 320 contains multiple target instances for the requested target. There is a target instance, for example, for French text, German text, English text, and the like. The decision engine 310 examines the potential target instances as well as the attributes associated with each target instance. In this case, the attributes for each target instance require a particular language attribute in order for a particular target instance to be valid. More specifically, the decision engine 310 determines from the content directory 320 that the language attribute is needed in order to make a decision.

The decision engine 310 requests the value of the attribute from an attribute provider 340. Attribute provider 340 supplies the value of the attributes identified by the decision engine 310. Attribute provider 340 may be supplied by an application or may be a database or other module capable of yielding the necessary data to the decision engine 310. The information stored or accessed by the attribute provider 340 may be user preferences, client configuration information and the like. An attribute based content system may have more than one attribute provider 340, and each attribute may have a preferred attribute provider 340. Thus, the attribute provider 340 that actually supplies the value of the attribute can vary and may depend on the attribute whose value is being determined. Alternatively, the server application 300 may supply the value of the attribute.

After the decision engine 310 has received the value of the language: attribute from an attribute provider 340, the contextually appropriate version or resource may be selected and identified by the decision engine 310 for the server application 300. Thus, the rules or attributes contained in the content directory 320 partially ensure that a contextually appropriate resource will be identified by the decision engine 310. In this specific example, the decision engine 310 requests a language attribute from the application because the attributes of each target instance require a particular language in order for each respective target instance to be valid.

After the contextually appropriate target instance is identified, the decision engine 310 returns that potential target instance value to the server application 300. The instance value is typically a string value and the server application 300 is responsible for loading or accessing the application data 330 or file represented by the value returned by the decision engine 310. In other words, if a user speaks French, then the decision engine informs the server application 300 that the resource or file containing the French text should be selected and provided to the user. Thus, the server application 300 is able to localize the application data 330 for a particular user.

Figure 4:
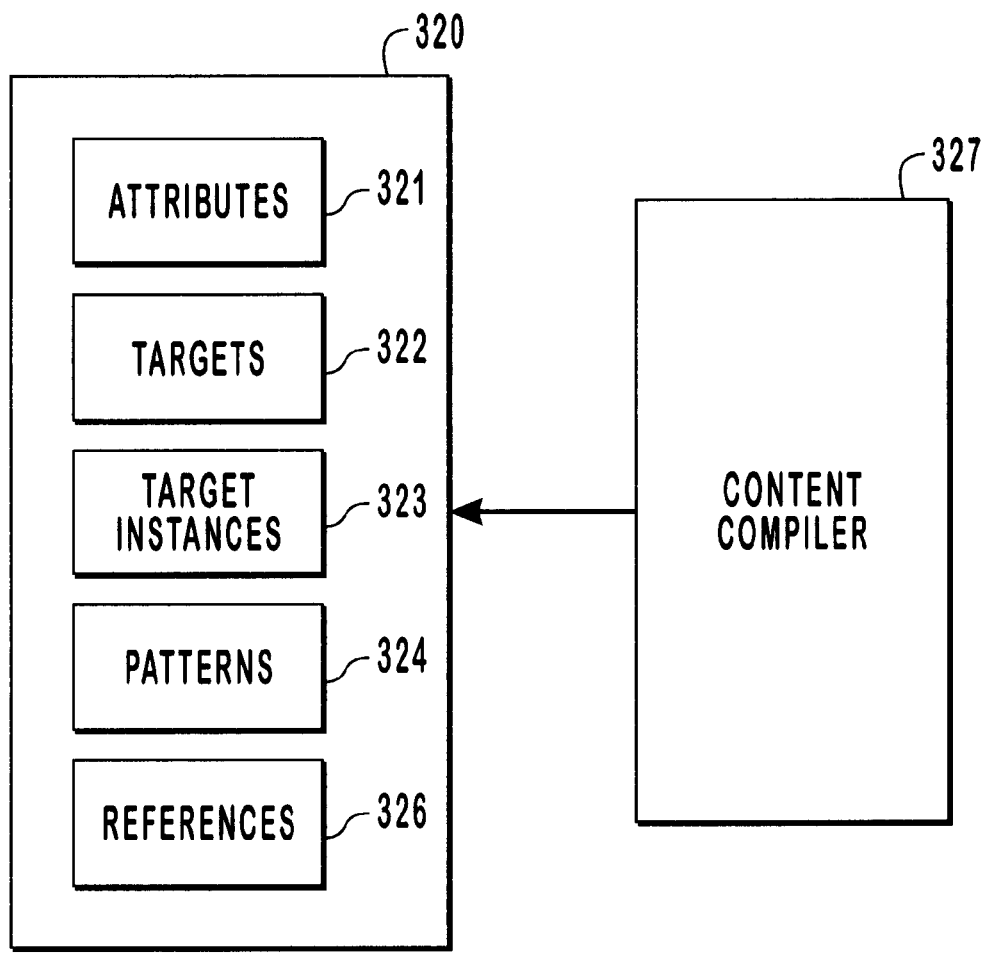
FIG. 4 illustrates a compiled content directory created by a content compiler.

FIG. 4 illustrates a content compiler 327, which preferably constructs content directory 320 from one or more XML source documents. The XML source documents contain elements and each element has associated element attributes which are referred to herein as "element attributes" to distinguish them from the attributes of the compiled content directory described in more detail below. In some instances the element attributes must be specified in the source document and in other instances, specifying the element attributes is optional.

Before discussing the content directory 320 in more detail, some of the elements and element attributes of attribute based content source files according to one embodiment of the invention will be briefly described. It is noted that the content compiler and the specific components of the content directory described below in reference to FIG. 4 represent but one example of content compilers and content directories, and that the invention can be practiced with other content compilers and content directories that have been created or selected according to the general principles disclosed herein.

The <Abc> element is the top level of an XML document that contains general attribute based content configuration information. The <AbcApplication> element is the top level of an XML document that contains an attribute based content application description. The <AbcPlatform> element is the top level of an XML document that contains an attribute based content platform description. Each of these top level elements can accept element attributes of name and destRoot, which is a destination path.

The <Exception> element used to embed processing exceptions in an attribute based content (ABC) document and has the following element attributes: name, exception, patterns, target, score, type, and instance. The <Description> element accepts an optional context attribute, which indicates the context for which the associated description text is appropriate. The <Attribute> element accepts the following element attributes: name, description, type, priority, provider, and lifespan.

The <Expect> element accepts the following element attributes: list and value. The <Target> element accepts as element attributes: name, description, and type. The <Priority> element—accepts as element attributes: attribute and priority. The <AttributeType> element accepts the following element attributes: name, description, substitute, and default. The <AttributeProvider> element accepts the following element attributes: name, description, and type. The <Lifespan> element accepts the following element attributes: name, description, and default. The <TargetType> element accepts the following element attributes: name, description, and type.

The <Instance> element accepts the following element attributes: value, priority, score, target, attribute, provider, and description. The <Where> element accepts the following element attributes: attribute, variable, matches, equals, operator, and value. The <Pattern> element accepts the following element attributes: name, pattern, target, type, instance, score, and export. The <Segment> element accepts the following element attributes: name, operator, attribute, string, and variable. The <variable> element accepts the following element attributes: name value. The <Import> element accepts the following element attributes: name, description, dir, file, subdirs, patterns, files, required, srcRoot, and from. The <Files> element accepts the following element attributes: include and exclude. The <Relocate> element accepts the following element attributes: name and value.

While the exemplary source documents or configuration files referred to herein are described in terms of Extensible Markup Language (XML), it is understood that other source documents having a different syntax or format may be used to construct the content directory 320. Regardless of the format or syntax of the source document, the information provided or contained in the source documents may be used by the content compiler 327 to construct the content directory 320. Further, the terms "elements" and "attributes" are used to describe the content of the XML source documents or configuration files, but it is understood that those terms may also be used to describe the content of configuration tiles that do not have or use XML. It is further important to understand that the element attributes associated with the elements described above are not identical the attributes that are contained in the content directory 320.

FIG. 4 further details the content directory 320. The content directory 320 comprises attributes 321, which are named and typed values and partially describe the context in which the decision engine 310 is invoked by an application. Comparisons between attributes 321 are referred to herein as "criteria" and evaluating a criteria typically returns a value ranging from invalid to perfect, which can be numerically represented from zero (invalid) to 100 (perfect). Each attribute 321 is preferably assigned a default value with the range 0 to 100.

Attributes 321 typically are of a particular type and comparisons between different attributes 321 often depends on their type. For instance, numerical type attributes may be compared with a "greater than" operation while a string type attribute may be sorted. Attributes 321 may refer to the values of Hyper Text Transfer Protocol (HTTP) header fields, request parameters, or cookie values. For example, the following HTTP string is an example of an attribute declaration:

<Attribute name="Accept-language" type="language list" priority="90"/>.

The required name portion of the declaration specifies the name of the attribute being declared. Multiple definitions for a single name are allowed, but all declarations must be consistent. The type portion of the declaration is optional, but must be included in at least one declaration. As indicated above, the type of the declaration affects comparisons that are performed. The priority specifies the priority of the attribute with respect to all other attributes. More generally, attributes 321 are an example of rules that are used to localize data.

While the value of many attributes are supplied by an application or attribute provider, an attribute based content system can also employ derived attributes, which have only derived values. Derived attributes promote consistent behavior and can encapsulate complex or indirect decisions into a single easily referenced value. Derived attributes are especially useful for representing some decisions that are based on multiple factors. If a decision based on multiple factors occurs more than once, a derived attribute can promote consistency because it is likely that the conditions in the code will diverge over time. The following code illustrates the usefulness of a derived attribute.

Instead of:
If(has TVTuner)
    DownloadListings( . . . ),
derived attributes allows the following code to be implemented:
if(GetBooleanAbcAttribute(shouldSendListings))
    DownloadListings( . . . ).

Using a derived attribute eliminates the need to change the code if, for example, a content provider decides to collect a fee for providing the listings or set top boxes with tuners are sent to countries that do not provide listings.

Targets 322 are representative of potential values that can be returned by the decision engine in response to an application request. Each of the potential values is referred to as a target instance and is illustrated as target instances 323. The decision engine 310 chooses the most appropriate target instance and returns that value to the application. A target instance preferably specifies: the value of the target instance; the target of which the specified value is an instance; and an optional set of one or more criteria.

The <Target> tag is used to declare and define a target and the following declaration illustrates the Messages target:

<Target name="Messages" type="file"/>.

The name portion of the target declaration specifies the name of the target and while multiple definitions for a single target are allowed, all target declarations must be consistent.

The <Instance> element is preferably used to define instances of a particular target and may be defined either as part of the target declaration or as a stand alone declaration. The following example of an instance declaration also includes the <Where> element which specifies a set of criteria that must be satisfied in order for the target instance to be valid. The following example also illustrates the interaction between an element and its associated attributes.

<Instance value=de-DE/Messagesjnx" target="Messages">
   <Where attribute="Accept language" matches="de-DE"/>
</Instance>.

It is often possible for more than one target instance to satisfy the request of an application. In this situation, the value returned by the decision engine is often dependent on which attribute is evaluated first and which attributes or instances have the highest priority. For example, the following statements constitute three instances of a Messages target:

de-DE\Messages.jnx—if the Accept-language attribute contains de-DE;

fr-FR\Messages.jnx—if the Accept-language attribute contains fr-FR; and en-DE\Messages.jnx if the User-country attribute equals DE.

If these target instances are evaluated in a context where the User-country is "DE" and the Accept-language is "fr-FR," each of the target instances is potentially valid. In this case, the decision engine will return the target instance having the highest priority.

The content directory also comprises patterns 324. Patterns 324 are important to the content directory 320 because manually adding additional instances to the content directory 320 can be a tedious task and patterns 324 permit additional instances of a target to be automatically generated and added to the content directory 320. Patterns 324 are evaluated when the content directory 320 is compiled, which enables the correct file to be easily located without having to search through multiple directories. Patterns 324 also enable developers to define a naming convention in enough detail to generate the rules and conditions under which they apply.

An exemplary pattern is as follows:

<Pattern pattern="{LANG}/{FILE}. {EXT}" target="{FILE}">
   <Where var="LANG"="{accept-language}"/>
   <Where var="FILE" matches="*"/>
   <Where var="EXT" matches="{xml,jnx}"/>
</Pattern>.

The above pattern definition imports only those .xml and .jnx files that apply for a specified language. After a pattern is defined, target instances are added to the content directory 320 when the content directory is compiled. More particularly, the pattern definition is used when the contents of a directory are imported into the content directory 320. In this example, certain .xml and .jnx files are imported.

Patterns are flexible and can be reused for other contexts. For instance, the above pattern is easily altered to include image files in the content directory 320 by changing the "{xml,jnx}" to "{gif,jpg}." The <Pattern> tag or element is used to define a pattern, but the tag does not invoke the pattern. The <Import> tag is used to invoke the pattern as previously described. The content directory 320 further comprises references 326, which refer to other content directories or to other attribute based content files which may be incorporated when the attribute based content file is compiled into the content directory 320.

Another aspect of the source files or documents is that configuration information can be embedded within the source files. Thus, a ".jnx" or ".xml" or other source file can be essentially self-describing. This is important because a user is no longer required to update a central configuration file when files are added or removed from the system. By embedding configuration information within the source files, the content of those files is easily incorporated each time the content directory is compiled. For example, when a <pattern> tag is used to import a resource into the content directory, the resource itself can define how it is imported.

The content compiler 327 illustrated in FIG. 4 combines declarations like those illustrated above into a compact and optimized content directory 320. The following table is used to further illustrate the generation of a content directory 320 from an attribute based content source file.

| Application Content Files: | Example.abc contains |
| --- | --- |
| Example.abc | <AbcApplication name = "example"> |
| Start.jnx | <Attribute name = "accept-language" type' language-list"/> |
| En-US/Messages.jnx | <Target name = "Start" type = "file"> |
| De-DE/Messages.jnx | <Instance value = "Start.jnx"/> |
| | </Target> |
| | <Target name = "Messages" type = "file"> |
| | <Instance value = "en-US/Messages.jnx"> |
| | <Where attribute = "accept-language" matches = "en-US"/> |
| | </Instance> |
| | <Instance value = "de-DE/Messages.jnx"> |
| | <Where attribute = "accept-language" matches = "de-DE"/> |
| | </Instance> |
| | <Instance value = "en-US/Messages.jnx" score = "10"/> |
| | </Target> |
| | <AbcApplication> |

The compilation of example.abc, which is an exemplary configuration file, by the content compiler 327 provides two targets: Start and Messages. The Start target only has a single target instance while the Messages target has a target instance for both German and English. Also specified in this example is a target instance for the Messages target that is used for users who accept neither German nor English. The content compiler 327 combines all of the possible target instances definitions into a single decision tree for each target, which enables the appropriate version to be quickly identified by the decision engine. Patterns, as previously described, are particularly useful in assisting the compilation of the content directory 320 as additional target instances are imported into the content directory when the patterns are invoked during compilation of the content directory. If files are to be removed or added from the content tree, it will be necessary to recompile the content directory.

The systems and methods for attribute based content as described herein may also be implemented on a client system. An application on the client is therefore capable of identifying a contextually appropriate version of data that is resident on a client. For example, a client may have the following image with the files:

en-US/PAL/TVHome.htm;
en-US/NTSC/TVHome.htm;
nl-NL/PAL/TVHome.htm; and
nl-NL/NTSC/TVHome.htm.

Each of these files is a version of a home page in this example. The content compiler will determine that these files are all distinct target instances of the TVHome target that are dependent on various combinations of language and screen size. The decision tree in the content directory is as follows:

if lang matches en-US
   if screen matches PAL
      result is en-US/PAL/TVHome.htm

```
            if screen matches NTSC
                result is en-US/NTSC/TVHome.htm
        if lang matches nl-NL
            if screen matches PAL
                result is nl-NL/PAL/TVHome.htm
            if screen matches MTSC
                result is nl-NL/NTSC/FVHome.htm.
```

In this manner, attribute based content may be integrated with a client.

In addition to resolving the appropriate target instances as previously described, resolving the appropriate target instance may be accomplished through the use of a specialized Uniform Resource Locator (URL). For example, the URL may include an "abc:" or other suitable portion that will invoke the decision engine. Using the above example, when a browser or other application encounters "abc: URL," then the decision engine is invoked to determine which version of the TVHome.htm file is appropriate. At runtime, the decision engine can determine which version is appropriate by interrogating the client. More specifically, the system registry, request headers and the like may be queried by the decision engine to resolve the appropriate target instance. In other words, an application such as a client browser can invoke the decision engine by providing an appropriate identifier in the URL. The identifier causes the request to the decision engine to be generated such that the target may be resolved and the appropriate target instance identified. One advantage is that a URL such as "abc:TVHome" may be used instead of requiring that logic be created in multiple places to choose between the various versions of the TVHome page.

This can be extended to URLs and other files that are not resident on the client. For example, instead of creating code that will link to every possible version of an external web page or portal, the systems and methods of attribute based content can be used to determine which site is the contextually appropriate site. In this manner, an English speaking user will be directed to an English version of the site and a user that prefers a different language will be directed to the appropriate version that corresponds to the user's preferred language.

In these specific instances, the decision engine resides on the client, but the decision engine could reside on a computer that is external to the client. Similarly, the rules may reside either internal or external to the client.

After a content directory has been compiled, the system is prepared to resolve decisions and assist in the localization of data. The content directory is effectively a simple decision tree that is easily traversed to identify an appropriate resource. The decision engine uses the attributes of the various elements to partially determine the context of the request. The values required by the attributes can be supplied by attribute providers, the requesting application, or can be derived. Once these values are obtained, a contextually appropriate target instance may be identified to a requesting application. Because attribute based content provides a single decision engine, consistency is assured within and across various applications. The extensibility and external configurability of attribute based content allows developers to customize the appearance and behavior of both applications and data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for providing context appropriate data to one or more clients based on one or more attributes of the requesting client, comprising:
   a first program module comprising a server application having computer executable instructions for providing data in response to user requests received from a client;
   a second program module, configured to interact with the first program module through a standardized, extensible and externally configurable interface, comprising a decision engine, a content directory, one or more attribute providers and computer executable instructions for
      creating a decision tree for each target in the content directory;
      receiving, at the decision engine, a request from the application for target data, wherein the target data is represented by one or more target instances stored in the content directory;
      identifying, by the decision engine, one or more attributes associated with each of the target instances;
      obtaining, by the decision engine, the value of one or more attributes from the one or more attribute providers;
      selecting an appropriate target instance from the content directory based on an evaluation of the one or more attributes; and
      communicating the identity of the appropriate target instance to the application, such that additional target instances may be added to the content directory and additional attributes may be added to the second program module without having to modify the computer executable instructions of the server application.

2. A system as defined in claim 1, wherein the second program module further comprises computer executable instructions for compiling the content directory.

3. A system as defined in claim 2, wherein the computer executable instructions for compiling the content directory comprises computer executable instructions for evaluating one or more patterns.

4. A system as defined in claim 3, wherein a pattern is configured to import additional target instances into the content directory when the content directory is compiled.

5. A system as defined in claim 4, wherein a pattern has element attributes comprising: name attribute, pattern, target, type instance, score and export.

6. A system as defined in claim 1, wherein the target data comprises a set of strings and each of the target instances identifies a different version of the set of strings.

7. A system as defined in claim 1, wherein the one or more attributes comprise rules for evaluating a target instance in the context of the request from the application.

8. A system as defined in claim 1, wherein a value of at least one of the one or more attributes is provided by an attribute provider that exists separately from the application.

9. A system as defined in claim 1, wherein a value of at least one of the one or more attributes is derived.

10. A system as defined in claim 1, wherein the content directory comprises attributes, targets, target instances, references, and patterns.

11. A system as defined in claim 1, wherein the computer executable instructions for selecting an appropriate target instance comprises computer executable instructions for traversing, by the decision engine, the decision tree for the target specified by the application.

12. A system for providing context appropriate data to one or more clients based on one or more attributes of the requesting client, comprising:
   a first program module comprising a server application having computer executable instructions for providing data in response to user requests received from a client;
   a second program module, configured to interact with the first program module through a standardized, extensible and externally configurable interface, comprising a decision engine, a content directory, wherein the content directory comprises a decision tree, one or more attribute providers and computer executable instructions for
      receiving, at a decision engine, a request from the application for the identification of an appropriate resource included in the application data to be used by the application;
      evaluating, by the decision engine, a content directory associated with the application to determine one or more attributes to be used to identify the appropriate resource;
      requesting a value of the one or more attributes;
      selecting, by the decision engine, the appropriate resource from the content directory based on the value of the one or more attributes; and
      providing the identity of the appropriate resource to the application, such that additional resources may be added to the content directory and additional attributes may be added to the second program module without having to modify the computer executable instructions of the server application.

13. A system as defined in claim 12, wherein the request further comprises a target.

14. A system as defined in claim 13, wherein the content directory contains a target specified by the application.

15. A system as defined in claim 13, wherein the content directory contains one or more target instances, each target instance representing a different version of the target.

16. A system as defined in claim 15, wherein the one or more attributes are associated with at least one of the target instances.

17. A system as defined in claim 12, wherein the content directory is compiled from one or more attribute based content files.

18. A system as defined in claim 12, wherein the value of the attribute is supplied by an attribute provider that exists separately from the application.

19. A system as defined in claim 12, wherein the value of the attribute is derived.

* * * * *